United States Patent [19]

Jones

[11] 4,009,133

[45] Feb. 22, 1977

[54] ELECTRODEPOSITABLE EPOXY RESINS HAVING QUATERNARY GROUPS CARRYING BLOCKED NCO, AND AQUEOUS DISPERSIONS

[75] Inventor: James E. Jones, Lower Burrell, Pa.

[73] Assignee: PPG Industries, Inc., Pittsburgh, Pa.

[22] Filed: Aug. 1, 1975

[21] Appl. No.: 601,111

[52] U.S. Cl. .................. 260/29.2 TN; 204/181; 260/29.2 EP; 260/29.6 H; 260/29.6 HN; 260/47 EP; 260/47 EN; 260/830 R; 526/27; 526/30; 526/49

[51] Int. Cl.$^2$ .................. C25D 13/06; C08F 8/30; C08F 8/34; C08G 18/58

[58] Field of Search ........... 260/29.2 EP, 29.2 TN, 260/29.6 H, 29.6 HN, 830 R, 47 EP, 47 EN; 526/27, 30, 49

[56] References Cited

UNITED STATES PATENTS

| | | | |
|---|---|---|---|
| 2,676,166 | 4/1954 | Webers | 526/49 |
| 3,336,253 | 8/1967 | Wong et al. | 260/29.2 EP |
| 3,391,097 | 7/1968 | Williamson | 260/29.2 EP |
| 3,429,839 | 2/1969 | Franco | 260/29.2 EP |
| 3,935,087 | 1/1976 | Jerabek et al. | 204/181 |
| 3,936,405 | 2/1976 | Sturni et al. | 260/29.2 TN |
| 3,947,338 | 3/1976 | Jerabek et al. | 204/181 |
| 3,962,165 | 6/1976 | Bosso et al. | 260/29.2 EP |

*Primary Examiner*—Murray Tillman
*Assistant Examiner*—A. H. Koeckert
*Attorney, Agent, or Firm*—William J. Uhl

[57] ABSTRACT

Resinous vehicles suitable for use in cationic electrodeposition are disclosed. The vehicles comprise the reaction product of an epoxy-containing organic material and an organic tertiary amine acid salt or sulfide-acid mixture; the amine and the sulfide containing blocked isocyanate groups capable of unblocking at elevated temperatures to cure the resinous vehicle.

12 Claims, No Drawings

ELECTRODEPOSITABLE EPOXY RESINS HAVING QUATERNARY GROUPS CARRYING BLOCKED NCO, AND AQUEOUS DISPERSIONS

BACKGROUND OF THE INVENTION

1. Field of the Invention

The present invention relates to cationic electrodeposition and, more particularly, relates to resinous electrodepositable compositions which deposit on the cathode.

2. Brief Description of the Prior Art

Electrodeposition as a coating application method involves the deposition of a film-forming material under the influence of an applied electrical potential, and has become of increasing commerical importance. Along with the increased use of such methods has been the development of various compositions which provide more or less satisfactory coatings when applied in this manner. However, most conventional coating techniques do not produce commerically usable coatings, and electrodeposition of many coating materials, even when otherwise successful, is often attended by various disadvantages such as non-uniform coatings and by poor throwpower, that is, the ability to coat areas of the electrode which are remote or shielded from the other electrode. In addition, the coatings obtained are, in many instances, deficient in certain properties essential for their utilization in certain applications for which electrodeposition is otherwise suited. In particular, properties such as corrosion resistance and alkali resistance are difficult to achieve with the resins conventionally employed in the electrodeposition process, and many electrodeposited coatings are subject to discoloration or staining because of chemical changes associated with electrolytic phenomena at the electrodes and with the types of resinous materials ordinarily utilized. This is especially true with the conventional resin vehicles used in electrodeposition processes which contain polycarboxylic acid resins neutralized with a base; these deposit on the anode and because of their acidic nature, tend to be sensitive to common types of corrosive attack, for example, by salt, alkali, and so forth. Further, anionic deposition tends to take place with the uncured coating in proximity to metal ions evolved at the anode, thereby causing staining of many coating systems.

CROSS-REFERENCE TO RELATED APPLICATIONS

U.S. application Ser. No. 535,592, filed Dec. 23, 1974, now U.S. Pat. No. 3,935,087, to Jerabek et al discloses a resin formed by reacting a partially blocked organic polyisocyanate with a quaternary onium salt-containing epoxy resin.

U.S. application Ser. No. 547,325, filed Feb. 5, 1975, now U.S. Pat. No. 3,947,338 to Jerabek et al discloses a self-crosslinking cationic electrodepositable composition comprising the reaction product of a partially blocked organic polyisocyanate and an amine adduct of an epoxy group-containing resin.

U.S. application Ser. No. 601,108, filed even date herewith, to Schimmel et al. discloses pigment pastes containing high concentrations of pigments dispersed in resinous vehicles which are the reaction product of an epoxy-containing organic material and an organic tertiary amine acid salt which contains blocked isocyanate groups.

SUMMARY OF THE INVENTION

In accordance with the present invention, a hydroxyl group-containing resinous vehicle suitable for use in cationic electrodeposition is provided. The resinous vehicle comprises the reaction product of an epoxy-containing organic material and an organic tertiary amine acid salt or sulfide-acid mixture; the amine and the sulfide containing blocked isocyanate groups capable of unblocking at elevated temperature to crosslink said resinous vehicle.

DETAILED DESCRIPTION OF THE INVENTION

The organic polyepoxides can be a monomeric or polymeric compound or mixture of compounds having a 1,2-epoxy equivalency greater than 1.0, that is, in which the average number of 1,2-epoxy groups per molecule is greater than 1. It is preferred that the organic polyepoxide be polymeric or resinous.

The polyepoxide can be any of the well-known epoxides, examples of these polyepoxides have, for example, been described in U.S. Pat. Nos. 2,467,171; 2,615,007; 2,716,123; 3,030,336; 3,053,855; and 3,075,999. A useful class of polyepoxides are the polyglycidyl ethers of polyphenols, such as Bisphenol A. These may be prepared, for example, by etherification of a polyphenol with epichlorohydrin or dichlorohydrin the presence of an alkali. The phenolic compound may be bis(4-hydroxy-phenyl)2,2-propane; 4,4'-dihydroxybenzophenone; bis(4-hydroxy-phenyl)1,1-ethane; bis(4-hydroxy-phenyl)1,1-isobutane; bis(4-hydroxy-tertiarybutyl-phenyl)2,2-propane; bis(2-hydroxy-naphthyl)methane; 1,5-hydroxynaphthalene; or the like. Another quite useful class of polyepoxides are produced similarly from novolak resins or similar polyphenol resins.

Also suitable are similar polyglycidyl ethers of polyhydric alcohols which may be derived from such polyhydric alcohols as ethylene glycol, diethylene glycol, triethylene glycol, 1,2-propylene glycol, 1,4-butylene glycol, 1,5-pentanediol, 1,2,6-hexanetriol, glycerol, bis-(4-hydroxy-cyclohexyl)2,2-propane, and the like.

There can also be employed polyglycidyl ethers of polycarboxylic acids which are produced by the reaction of epichlorohydrin or similar epoxy compounds with an aliphatic or aromatic polycarboxylic acid, such as oxalic acid, succinic acid, glutaric acid, terephthalic acid, 2,6-naphthalene dicarboxylic acid, dimerized linoleic acid and the like. Examples are diglycidyl adipate and diglycidyl phthalate. Also useful are polyepoxides derived from the epoxidation of an olefinically unsaturated alicyclic compond. Included are diepoxides comprising, in part, one or more monoepoxides. These polyepoxides are non-phenolic and obtained by epoxidation of alicyclic olefins, for example, by oxygen and selected metal catalysts, by perbenzoic acid, by acid-aldehyde monoperacetate or by peracetic acid. Among the polyepoxides are the epoxy alicyclic ethers and esters which are well known in the art.

Other epoxies which may be employed are acrylic polymers containing epoxy groups and hydroxyl groups. Preferably, these acrylic polymers are polymers producted by copolymerizing and unsaturated epoxy-containing monomer, such as, for example, glycidyl acrylate or methacrylate, a hydroxyl-containing unsaturated monomer and at least one other unsaturated monomer.

Any polymerizable monomeric compound containing at least one $CH_2=C<$ group, preferably in the terminal position, may be polymerized with the unsaturated glycidyl compounds. Examples of such monomers include aromatic compounds such as phenyl compounds, for example, styrene, alpha-methyl styrene, vinyl toluene and the like. Also, aliphatic compounds such as olefinic acids and esters, such as acrylic acid, methyl acrylate, ethyl acrylate, methyl methacrylate and the like may be employed.

In carrying out the polymerization reaction, techniques well known in the art may be employed. A peroxygen-type catalyst is ordinarily utilized; diazo compounds or redox catalyst systems can also be employed as catalysts.

The preferred hydroxy-containing unsaturated monomers are hydroxyalkyl acrylates, for example, hydroxyethyl acrylate or methacrylate or hydroxypropyl acrylate or methacrylate may be used.

Another method of producing acrylic polymers which may be utilized in the present invention is to react an acrylic polymer containing reactive sites, including hydroxyl groups, with an epoxy-containing compound such as diglycidyl ether of Bisphenol A or other polyepoxides as enumerated elsewhere herein, to provide epoxy group-containing hydroxyl group-containing acrylic polymers.

The organic tertiary amine acid salt containing blocked isocyanate moieties is capable of reacting with and opening the epoxide moiety to form hydroxyl-containing quaternary ammonium-containing adducts. The amine may be aliphatic, mixed aliphatic-aromatic, aralkyl or cyclic. The acid of the tertiary amine acid salt is preferably an acid having a $pK_a$ less than 5 such as hydrochloric acid, sulfuric acid and boric acid. Preferably, the acid is an organic acid such as acetic acid and lactic acid, with lactic acid being the most preferred. The organic sulfide or thioether containing blocked isocyanate moieties is one which upon mixture with acid is capable of reacting with and opening the epoxide moiety to form hydroxyl-containing ternary sulfonium-containing resins. The sulfide may be aliphatic, mixed aliphatic-aromatic, aralkyl or cyclic.

In order to open the epoxide ring, the sulfide should be mixed with acid. Examples of suitble acids are those mentioned above in connection with the tertiary amine acid salts. The ratio of sulfide to acid is not unduly critical. Since one mole of acid is utilized to form one mole of sulfonium group, it is preferable that at least about one mole of acid be present for each mole of desired sulfide-to-sulfonium conversion.

In order to incorporate blocked isocyanate moieties into the amine or sulfide molecule, the amine or sulfide should contain an active hydrogen. The term "active hydrogen" refers to hydrogens which, because of their position in the molecule, display activity according to the Zerewitinoff test as described by Kohler in the *Journal of the American Chemical Society*, 49, 3181 (1927). Examples of active hydrogens would be those attached to oxygen, nitrogen and sulfur. Examples of tertiary amines which contain active hydrogens include hydroxyl-containing tertiary amines such as dimethyl ethanolamine, methyl diethanol amine, 1-dimethylamino-2-propane, diethylamino-ethoxy ethanol and di-n-propanol amine. Examples of sulfides which contain active hydrogens include hydroxyl-containing thioethers such as thiodiethanol, ethyl thioethanol, 2-thiophene ethanol, 2-tetrahydrothiophene ethanol, tetrahydrothiopyran-3-ol.

In the preferred manner of preparing the resinous vehicle of the invention, the organic polyisocyanate is partially blocked or capped with a blocking agent and the partially capped product is then reacted with the active hydrogen-containing amine or sulfide. Alternately, the active hydrogen-containing amine or sulfide can be used to partially block the organic polyisocyanate followed by fully blocking or capping the polyisocyanate with a suitable blocking agent as the type described below.

In the preferred manner of preparing the resinous vehicle, the reaction between the organic polyisocyanate and the blocking agent may optionally be conducted in the presence of a urethane-forming catalyst. Reaction is usually exothermic, therefore, the polyisocyanate and blocking agent are preferably mixed at no higher than 100° C. and preferably below 50° C. to minimize the exotherm effect.

The partially blocked or capped polyisocyanate is then usually reacted with an active hydrogen-containing tertiary amine or sulfide through active hydrogen functionality under conditions which will not unblock the isocyanate. Preferably, one equivalent of the partially capped polyisocyanate is reacted with one equivalent of an active hydrogen-containing tertiary amine or sulfide which results in fully capping the isocyanate, making it part of the amine or sulfide molecule. Reaction between the partially capped polyisocyanate and the active hydrogen-containing tertiary amine or sulfide is conducted at low or moderate temperature and optionally in the presence of a urethane-forming catalyst. Generally, the reaction temperature is less than 100° C. to preserve the capped isocyanate groups and to avoid gelling of the product. Typical reaction temperatures are between 30° and 90° C. The reaction may be conducted in the presence of solvent if desired. If solvent is employed, preferably it is capable of being used in the ultimate composition which is formed. Suitable solvents are those which do not contain active hydrogens and include, for example, ketones and ethers.

It may be desirable to have present in the coating composition a catalyst for urethane formation so that when the blocked isocyanates unblock during curing of the electrodeposited coating, crosslinking will be complete. However, if curing temperatures after electrodeposition are high enough, catalyst may not be needed. Examples of urethane-forming catalyst are the tin compounds such as dibutyltin dilaurate, dibutyltin acetate and dibutyltin oxide, which are preferred, but other catalysts for urethane formation known in the art may be employed. Usually up to 5 percent by weight catalyst based on total reactant weight is employed.

The adduct of the partially capped polyisocyanate and the tertiary amine containing active hydrogens is reacted with an acid to form the corresponding tertiary amine acid salt. With regard to the sulfide, the sulfide is mixed with acid after the adduct of the partially capped polyisocyanate and a sulfide containing active hydrogens is formed.

The isocyanate precursor of the blocked polyisocyanate moiety may be derived from an organic polyisocyanate, preferably an organic diisocyanate. Representative examples are the aliphatic diisocyanates such as tetramethylene and hexamethylene diisocyanates; cycloaliphatic diisocyanates such as 1,3-cyclopentane and 1,4-cyclohexane diisocyanate, isophorone diisocyanate; aromatic diisocyanates such as m-phenylene and 1,4-naphthalene diisocyanates; the aliphatic-aromatic diisocyanates such as 4,4'-diphenylene methane, 2,4- or 2,6-toluene or mixtures thereof and 1,4-xylylene diisocyanates; the nuclear substituted aromatic compounds such as dianisidine diisocyanates; 4,4'-diphenylether diisocyanate and chlorodiphenylene diisocyanate. Higher functionality isocyanates such as triisocyanates such as triphenylmethane-4,4',4''-triisocyanate, 1,3,5-triisocyanate benzene and 2,4,6-triisocyanate toluene; and the tetraisocyanates such as 4,4'-diphenyl-dimethyl-methane-2,2',5,5'-tetraisocyanate and the polymerized polyisocyanates such as toluene diisocyanate dimers and trimers and the like may also be used.

In addition, the organic polyisocyanate may be a prepolymer derived from polyols including polyether polyols or polyester polyols, or simple polyols such as glycols, for example, ethylene glycol and propylene glycol, as well as other polyols such as glycerol; trimethylol propane; hexanetriol; pentaerythritol; and the like.

The blocking agent for the organic polyisocyanate can be any suitable aliphatic, cycloaliphatic, aromatic, alkyl monoalcohol, phenolic compound and oxime such as, for example, aliphatic alcohols containing from 1 to 10 carbon atoms, such as methyl, ethyl, chloroethyl, propyl, butyl, amyl, hexyl, heptyl, octyl, nonyl, 3,3,5-trimethyl hexanol, 2-ethyl hexanol, decyl, and the like; the aromatic-alkyl alcohols such as phenyl-carbinol, methyl phenyl-carbinol; alcohols containing ether linkages such as ethylene glycol monoethyl ether, ethylene glycol monobutyl ether and the like; phenolic compounds such as phenol itself, substituted phenols in which the substituents do not adversely affect the coating operation, such as cresol, xylenol, nitrophenol, chlorophenol, ethylphenol and t-butylphenol. Minor amounts of even higher molecular weight, relatively non-volatile monoalcohols and phenols may be used, if desired, to serve as plasticizers in the coating provided by the present invention. Examples include nonyl phenol, monofunctional polyethylene and polypropylene oxides such as CARBOWAX 550.

Besides the above, additional blocking agents include oximes, such as methyl ethyl ketoxime, acetone oxime, and cyclohexanone oxime. Use of the oximes and phenols is particularly desirable because polyisocyanates blocked with these agents unblock at relatively low temperatures.

The proportions of epoxy-containing organic material and organic tertiary amine which are reacted with one another should be selected such that the resinous vehicle contains between 0.1 to 1, and preferably 0.2 to 0.3, milliequivalents of quaternary nitrogen per gram of resin. Lower than the recommended amounts of milliequivalent per gram results in poor resin solubility and unacceptable film builds upon electrodeposition. Higher than the recommended amounts of milliequivalent per gram results in a resin which is too water soluble for electrodeposition purposes.

The resinous vehicle of the invention is electrodeposited on a suitable substrate and cured at elevated temperatures, such as from about 75° to about 300° C., the film curing through urethane crosslinks. The blocking agent released may either volatilize or remain in the mixture, depending essentially on its boiling point. The resinous vehicle before electrodeposition is soluble in organic solvents and is characterized by its epoxy content, its hydroxyl content and chemically bound quaternary ammonium or ternary sulfonium content and capped isocyanate group content. When electrodeposited and cured, the resinous vehicle forms crosslinked, infusible, hard, thermosetting material.

Aqueous compositions containing the resinous product of the invention are highly useful as coating compositions and can be applied by many conventional methods such as dipping, brushing, and so forth. The aqueous compositions are, however, eminently suited for application by electrodeposition.

For electrodeposition, the above-described resinous products are dispersed in water to about 1 to 30 percent by weight resin solids aqueous dispersions. The term "aqueous dispersion" as used within the context of the present invention is intended to cover two-phase, translucent, aqueous-resin systems, especially those in which the aqueous phase forms the continuous phase, and is also intended to cover homogeneous aqueous solutions which appear optically clear. The aqueous dispersions of the present invention have dispersed phases which have average particle size diameters of about 0.1 to 5 microns. The dispersed phase may be spherical or elongated in shape or actually invisible by microscopic investigation.

The products can be employed as such to electrodeposit clear films, but ordinarily they are used as a vehicle along with a pigment composition. The pigment composition used may be any of the conventional type, comprising, for example, iron oxides, lead oxides, strontium chromate, carbon black, titanium dioxide, talc, barium sulfate and the like, as well as combinations of these in similar pigments. Color pigments such as cadmium yellow, cadmium red, phthalocyanine blue, chromic yellow, toluidine red, hydrated iron oxide, and the like may also be included. Dispersing or surface active agents should be of non-ionic or cationic type or a combination of these types can be employed.

Usually the pigment and surface active agent, if used, are ground together in a portion of the vehicle to make a paste, and this is blended with a major portion of the vehicle to produce a coating composition. There may also be included in the coating compositions additives such as anti-oxidants, wetting agents, dryers, anti-foaming agents, suspending agents, and the like. It is often desirable to include small amounts of water-miscible organic solvents, which may be added to the resinous vehicle to aid in handling and processing. Examples of such solvents are 4-methoxy-4-methyl-pentanone-2, which is preferred, and other solvents such as dioxane and glycol ethers can be used.

It has been found in most instances that desirable coatings are obtained using pigmented compositions containing weight ratios of pigment to vehicle of 1.5 to 1 or less and preferably less than about 1 to 1. If the composition has too high a pigment-to-vehicle ratio, the electrodeposition film may deposit poor flow characteristics.

In formulating the water-dispersed compositions, ordinary tap water may be employed. However, such water may contain relatively high levels of cations, which, while not ordinarily rendering the process inoperative, may result in variations in the properties of the baths when used for electrodeposition. In such cases, it is often desirable to utilize deionized water from which the free ions have been removed, as by passage through an ion exchange resin.

In the electrodeposition process employing the aqueous coating compositions described above, the aqueous composition is placed in contact with an electrically conductive anode and an electrically conductive cathode with the surface to be coated being the cathode. Upon passage of electric current between the anode and the cathode, while in contact with the bath containing the coating composition, an adherent film of the coating composition is deposited on the cathode. This is in contrast to processes utilizing polycarboxylic acid resins which deposit on the anode, and many of the advantages described above are in a large part attributed to this cathodic deposition.

The conditions under which electrodeposition is carried out are, in general, similar to those used in electrodeposition of other types of coatings. The applied voltage may be varied greatly and can be, for example, as low as one volt or as high as several thousand volts, although typically between 50 volts and 500 volts are employed. The current density is usually between about 1.0 ampere and 15 amperes per square foot and tends to decrease during electrodeposition. The method of the invention is applicable to the coating of any electrically conductive substrate and especially metal such as steel, aluminum, copper and the like. After deposition, the coating is cured at elevated temperatures by any convenient method, such as baking in ovens or with banks of infrared heat lamps. Curing temperatures depend principally on the blocking agent for the isocyanate and preferably are from about 75° to 300° C.

The invention will be described further in conjuction with several examples showing the method and practice of the invention. These examples, however, are not be construed as limiting the invention to their details. All parts and percentages by weight are based upon nonvolatile solvents unless otherwise indicated.

EXAMPLE I

An organic tertiary amine acid salt was prepared from the following charge:

| Ingredient | Parts by Weight |
| --- | --- |
| 2-Ethyl hexanol half-capped toluene diisocyanate in methyl isobutyl ketone, 95% solids | 320 |
| Dimethyl ethanolamine | 89 |
| 75% by weight aqueous lactic acid solution | 120 |
| Isopropanol | 75 |

The dimethyl ethanolamine was added to the 2-ethyl hexanol half-capped toluene diisocyanate under a nitrogen blanket at 25° C. The reaction mixture exothermed with the final temperature reaching 80° C. at the completion of the addition. After addition of the dimethyl ethanolamine, the lactic acid solution was added followed by the addition of isopropanol to form an 80 percent solids solution with the organic tertiary amine acid salt.

EXAMPLE II

A hydroxyl group-containing resinous vehicle suitable for use in cationic electrodeposition was prepared from the organic tertiary amine acid salt of Example I and an epoxy-containing organic material in the following charge ratio:

| Ingredient | Parts by Weight |
| --- | --- |
| EPON 829[1] | 833.6 |
| Bisphenol A | 269 |
| 5,5-Dimethyl hydantoin | 57 |
| Ethyl triphenyl phosphonium iodide | 22.4 |
| 2-Ethyl hexanol | 125 |
| Quaternizing agent of Example I | 331.8 |
| Deionized water | 80.0 |
| Isophorone | 50 |
| Isopropanol | 200 |
| Deionized water | 25 |

The EPON 829 and Bisphenol A were charged to a suitable reaction vessel and heated to 155° C. to initiate an exotherm. The temperature was maintained between 151°–180° C. for about one hour followed by the sequential addition of the 5,5-dimethyl hydantoin and ethyl triphenyl phosphonium iodide catalyst at 165° C. and 155° C., respectively. The reaction mixture was maintained at a temperature of 155°–178° C. for about one hour followed by the addition of the 2-ethyl hexanol at 158° C. The reaction temperature was lowered to 105° C. over a 20-minute period and the quaternizing agent and first portion of deionized water added to the mixture. The isophorone was then added to reduce the viscosity, followed by the sequential addition of isopropanol and the second portion of deionized water to form a dispersion having a solids content of 80.26 percent.

EXAMPLE III

An electrodeposition bath was prepared with the resinous product of Example II by dispersing 128.6 parts of it with 1.8 parts of dibutyltin dilaurate and 771 parts of deionized water. Zinc phosphated steel panels electrocoated with this bath at 200 volts for 90 seconds at a bath temperature of 23° C. gave acetone-resistant, although somewhat cratered, films of 0.4 mil thickness when cured for 20 minutes at 210° C.

EXAMPLE IV

A hydroxyl group containing, epoxy-containing acrylic polymer was prepared from the following charge:

| Monomer | Parts By Weight |
| --- | --- |
| Methylmethacrylate | 360 |
| Glycidylmethacrylate | 720 |
| 2-hydroxy ethylacrylate | 360 |
| ethylacrylate | 360 |

The above monomer mixture also contained 54 parts of VAZO [azobis(isobutylronitrile)].

The polymer was prepared in a reaction flask equipped with a thermometer, stirrer, reflex condenser, and monomer addition means, and under a continuous nitrogen blanket.

Into the reactor was charged 712.4 parts by weight of butyl-CELLOSOLVE (ethylene glycol monobutylether) and 39 parts by weight of deionized water. The contents of the reactor were heated to reflux and the monomer mixture added dropwise over a two hour period to the refluxing contents of the reaction flask. After all the monomer mixture was added, the reaction mixture was kept at 110°–113° C. for one hour followed by the addition of 1.8 parts by weight of VAZO dissolved in 10 parts of butyl CELLOSOLVE. The reaction mixture was kept at 106°–118° C. for one hour followed by the addition of another 1.8 parts of the VAZO dissolved in 10 parts of butyl CELLOSOLVE. The reaction mixture was kept at 115°–118° C. for an additional hour, cooled, and then charged with 1.8 parts by weight of 2,6-ditertiary butyl-para cresol. The acrylic polymer had a solids content of 70.4 percent.

EXAMPLE V

A sulfide-acid mixture containing blocked isocyanate groups was prepared from the following charge:

| Ingredient | Parts By Weight |
|---|---|
| 2-ethylhexanol ½-capped toluene diisocyanate in methyl isobutylketone (95 percent solids) | 480 |
| Ethyl thioethanol | 153 |
| 75 percent aqueous lactic acid solution | 172.4 |
| butyl CELLOSOLVE | 63.1 |

The ethyl thioethanol was added to the 2-ethylhexanol ½ capped toluene diisocyanate under a nitrogen blanket at about 26° C. The reaction mixture exothermed with a final temperature reaching about 80° C. at the completion of the addition. After the addition of the ethyl thioethanol, the lactic acid solution was added followed by the addition of the butyl CELLOSOLVE to form an 85 percent solids solution.

EXAMPLE VI

The sulfide-acid mixture of Example V was reacted with epoxy-containing acrylic polymer of Example IV in the following charge ratio:

| Ingredient | Parts By Weight | Solids |
|---|---|---|
| Epoxy-containing acrylic polymer of Example IV | 255.4 | 178.7 |
| Butyl CELLOSOLVE | 100 | — |
| Sulfide-acid mixture of Example V | 294.1 | 250 |
| Deionized water | 25.0 | |

The epoxy-containing acrylic polymer and butyl CELLOSOLVE were charged to the reaction kettle and heated under a nitrogen blanket to 80°–90° C. The sulfide-acid mixture of Example V and deionized water were added, and the mixture held at 85°–90° C. for about 4 hours to form a 65 percent total solids mixture.

EXAMPLE VII

An electrodeposition bath was prepared with the product of Example VI by dispersing 100 parts of weight of it with one part by weight of dibutyltin diacetate in 500 parts by weight of deionized water. Aluminum panels electrocoated with this bath at 200 volts for 60 seconds, at a bath temperature of 23° C. gave acetone-resistant films when cured for 30 minutes at 450° F.

I claim:
1. A hydroxyl group-containing resinous vehicle suitable for use in cationic electrodeposition comprising the acidified reaction product of:
   A. an organic polyepoxide,
   B. an organic tertiary amine which contains blocked isocyanate groups or organic thioether which contains blocked isocyanate groups said blocked isocyanate groups capable of unblocking at elevated temperatures to crosslink said resinous vehicle.
2. The resinous vehicle of claim 1 in which the organic polyepoxide is a polyglycidyl ether of a polyphenol.
3. The resinous vehicle of claim 2 in which the polyphenol is Bisphenol A.
4. The resinous vehicle of claim 1 in which (B) is the adduct of an organic hydroxyl-containing tertiary amine and a half-capped diisocyanate.
5. The resinous vehicle of claim 1 in which (B) is the adduct of an organic, hydroxyl-containing thioether and a half-capped diisocyanate.
6. The resinous vehicle of claim 1 in which the isocyanate in (B) is blocked with a member selected from the class consisting of phenol and oximes.
7. An aqueous dispersion suitable for use in cationic electrodeposition comprising water as the principal ingredient and 1 to 30 percent by weight based on total weight of the aqueous dispersion of a hydroxyl group-containing resinous vehicle comprising the acidified reaction product of:
   A. an organic polyepoxide,
   B. an organic tertiary amine which contains blocked isocyanate groups or an organic thioether which contains blocked isocyanate groups said blocked isocyanate groups capable of unblocking at elevated temperatures to crosslink said resinous vehicle.
8. The aqueous dispersion of claim 7 in which the organic polyepoxide is a polyglycidyl ether of a polyphenol.
9. The aqueous dispersion of claim 8 in which the polyphenol is Bisphenol A.
10. The aqueous dispersion of claim 7 in which (B) is the adduct of an organic hydroxyl-containing tertiary amine and a half-capped diisocyanate.
11. The aqueous dispersion of claim 7 in which (B) is the adduct of an organic, hydroxyl-containing thioether and a half-capped diisocyanate.
12. The aqueous dispersion of claim 7 in which the isocyanate in (B) is blocked with a member selected from the class consisting of phenol and oximes.

* * * * *

UNITED STATES PATENT AND TRADEMARK OFFICE
CERTIFICATE OF CORRECTION

PATENT NO. : 4,009,133

DATED : February 22, 1977

INVENTOR(S) : James E. Jones

It is certified that error appears in the above-identified patent and that said Letters Patent are hereby corrected as shown below:

Column 2, line 27, insert --in-- after "dichlorohydrin".

Column 2, line 53, "compond" should be --compound--.

Column 2, line 64, "producted" should be --produced--.

Column 2, line 64, "and" should be --an--.

Column 3, line 46, "suitble" should be --suitable--.

Column 6, line 64, "inthe" should be --in the--.

Column 7, line 32, "conjuction" should be --conjunction--.

Column 7, line 34, insert --to-- after "not".

Column 8, line 12, after the first table insert the following:

-- [1]Epoxy resin solution made from reacting epichlorohydrin and Bisphenol A, having an epoxy equivalent of approximately 193-203, commercially available from Shell Chemical Company. --

Signed and Sealed this

Twenty-fourth Day of May 1977

[SEAL]

Attest:

RUTH C. MASON
*Attesting Officer*

C. MARSHALL DANN
*Commissioner of Patents and Trademarks*